United States Patent
Andersson

(10) Patent No.: US 11,368,649 B2
(45) Date of Patent: Jun. 21, 2022

(54) STREAMING OF A LIVE VIDEO STREAM

(71) Applicant: Axis AB, Lund (SE)

(72) Inventor: Viktor A. Andersson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/155,234

(22) Filed: Jan. 22, 2021

(65) Prior Publication Data
US 2021/0266497 A1 Aug. 26, 2021

(30) Foreign Application Priority Data
Feb. 24, 2020 (EP) .................................. 20158979

(51) Int. Cl.
| | |
|---|---|
| *H04N 7/04* | (2006.01) |
| *H04N 5/232* | (2006.01) |
| *H04N 5/77* | (2006.01) |
| *H04N 7/025* | (2006.01) |
| *G06V 20/40* | (2022.01) |
| *H04N 21/2187* | (2011.01) |

(52) U.S. Cl.
CPC .............. *H04N 7/04* (2013.01); *G06V 20/40* (2022.01); *H04N 5/23206* (2013.01); *H04N 5/77* (2013.01); *H04N 7/025* (2013.01); *G06V 20/44* (2022.01); *H04N 21/2187* (2013.01)

(58) Field of Classification Search
CPC ........ H04N 7/04; H04N 5/23206; H04N 5/77; H04N 7/025; H04N 21/2187; H04N 21/232; H04N 21/6543; H04N 21/4223; H04N 21/4334; H04N 21/2743; G06K 9/00711; G06K 2009/00738
See application file for complete search history.

(56) References Cited

U.S. PATENT DOCUMENTS 8,701,145 B1   4/2014 Berger et al.
2003/0025832 A1*  2/2003 Swart ................. H04N 21/2343
                                                           348/461

(Continued)

FOREIGN PATENT DOCUMENTS

CN    107959791 A    4/2018
CN    108012159 A    5/2018

(Continued)

OTHER PUBLICATIONS

Extended European Search Report dated Jul. 30, 2020 for the European Patent Application No. 20158979.3.

*Primary Examiner* — Fernando Alcon
(74) *Attorney, Agent, or Firm* — Volpe Koenig

(57) ABSTRACT

A method for streaming a live video stream in a system comprising a video camera generating the live video stream, a video recorder, and a video. The method comprises: at the video server, receiving, from a client device, a request for the live video stream from the video camera; transmitting from the video server, a push trigger to the video camera, the push trigger instructing the video camera to push the live video stream to the video recorder; upon receiving the push trigger, initiating a push of the live video stream from the video camera to the video recorder; pushing the live video stream from the video camera to the video recorder; pulling, by the video server, the live video stream from the video recorder; and transmitting, by the video server, the live video stream to the client device.

14 Claims, 4 Drawing Sheets

(56) References Cited

U.S. PATENT DOCUMENTS

| | | | |
|---|---|---|---|
| 2005/0063665 A1* | 3/2005 | Fujimoto | H04N 21/816 |
| | | | 386/219 |
| 2010/0097464 A1 | 4/2010 | Volpe | |
| 2016/0088326 A1 | 3/2016 | Solomon et al. | |
| 2017/0359555 A1 | 12/2017 | Irani et al. | |
| 2018/0113577 A1 | 4/2018 | Burns et al. | |
| 2019/0253839 A1 | 8/2019 | Owen | |
| 2019/0268627 A1 | 8/2019 | Drako et al. | |

FOREIGN PATENT DOCUMENTS

| CN | 108366292 A | 8/2018 |
|---|---|---|
| CN | 108989837 A | 12/2018 |
| EP | 3591941 A1 | 1/2020 |
| GB | 2563267 A | 12/2018 |
| TW | I602432 B | 10/2017 |
| WO | 2012/095867 A2 | 7/2012 |
| WO | 2013/089423 A1 | 6/2013 |
| WO | 2017/096841 A1 | 6/2017 |

* cited by examiner

STREAMING OF A LIVE VIDEO STREAM

TECHNICAL FIELD

The present invention relates to a method for streaming a live video stream, especially for streaming a live video stream in a system comprising a video camera capturing the live video stream, a video recorder, and a video server. Additionally, it relates to the system comprising the video camera, the video recorder, and the video server. Further, the video camera, the video recorder, and the video server are presented as individual devices.

BACKGROUND

Streaming a live video stream from a source, e.g. a video camera, is common in many applications, especially in monitoring applications. That is, the live video stream is streamed from the source capturing the live video stream to a receiver of the live video stream that consumes the live video stream. The receiver may consume the live video stream by e.g. displaying or recording the live video stream. The receiver of the live video stream may e.g. be a client device displaying the live video stream, a video recorder recording the live video stream or a video server distributing the live video stream to one or more client devices and/or video recorders. The streaming may be initiated in different ways. Two typical approaches for streaming are to use push streaming or pull streaming.

Push streaming is when the source takes initiative to the streaming. The push streaming may be triggered by an event detection. The event detection may be detection of motion in the live video stream or detection of appearance of an object, for example belonging to a specific object class, in the live video stream. In other words, the source performs a push of the live video stream to the receiver in response to a push trigger in the form of an event detection. The push trigger is generated at the source. A benefit of this approach for initiating streaming is a quick response to events, for example quick start in storing video for a detected motion event.

Pull streaming is when the receiver requests the live video stream from the source. Typically, the receiver is a video server that is responsible for providing the live video stream to one or more client devices at which the live video stream is to be displayed. A benefit of this approach for initiating streaming is that the streaming may be initiated by the receiver of the stream.

For some applications benefits from both push streaming and pull streaming of a live video from a source are desirable. However, implementing both push streaming and pull streaming may increase utilization of processing power at the source. Further, implementing both push streaming and pull streaming may increase the bandwidth utilization out from the source. Hence, there is a need for implementing both push streaming and pull streaming of a live video stream from a source which facilitates a reduction in utilization of processing power at the source and/or bandwidth out from the source.

SUMMARY

It would be desirable to mitigate, alleviate or eliminate one or more of the above-identified deficiencies in the art and disadvantages singly or in any combination and solve at least the above-mentioned problem.

According to a first aspect, a method for streaming a live video stream is provided. The method is implemented in a system comprising a video camera generating the live video stream, a video recorder, and a video server. The method comprises: at the video server, receiving, from a client device, a request for the live video stream from the video camera; transmitting, from the video server, a push trigger to the video camera, the push trigger instructing the video camera to push the live video stream to the video recorder; upon receiving the push trigger, initiating a push of the live video stream from the video camera to the video recorder; pushing the live video stream from the video camera to the video recorder; pulling, by the video server, the live video stream from the video recorder; and transmitting, by the video server, the live video stream to the client device.

By the present method for streaming a live video stream the two different approaches of push streaming and pull streaming may be combined giving benefits/effects of the both. This while providing a slim and processing-efficient solution. By straight-forward combining the approaches of push streaming and pull streaming the media source (typically a video camera) will need to be able to simultaneously transmit two live video streams, one push stream to the video recorder and one pull stream requested by the video server. However, implementing both push streaming and pull streaming in this straight-forward manner may increase utilization of processing power at the video camera. Further, increased utilization of the bandwidth out from the video camera will be needed. The present method provides a possible solution to these problems using a non-intuitive architecture. Namely, instead of the video server initiating a pull streaming from the video camera directly, a push trigger is sent from the video server to the video camera instructing the video camera to push stream the live video stream to the video recorder. The video server is thereafter pulling the live video stream from the video recorder. Hence, only one video streaming channel is needed to be established out from the video camera, enabling savings on utilization of the bandwidth out from the video camera. Further, the utilization of processing power at the video camera may be decreased. This since only one video stream is needed to be generated at video camera. Alternatively, buffer memory may be saved since the video camera does not need to buffer video data for both a push and a pull video stream. Hence, part of the limited processing capability and/or buffer memory at the video camera may be released in favor of other functions at the video camera.

The system implementing the solution may have intelligence to handle different scenarios that can arise. For example, the video server may have access to information regarding which video streams that the video recorder has access to at the moment. In that case, the video server needs to initiate a push trigger to the camera only when the desired live video stream is not available in the video recorder.

The step of transmitting, from the video server, the push trigger to the video camera may comprise a direct transmission of the push trigger from the video server to the video camera.

The step of transmitting, from the video server, the push trigger to the video camera may comprise routing the push trigger via the video recorder.

The method may further comprise: at the video camera continuously analyzing the live video stream for detecting an event of interest in the live video stream; upon detecting an event of interest in the live video stream, initiating, at the video camera, a push of the live video stream to the video recorder. Hence, the initiating, at the video camera, of a push of the live video stream to the video recorder may either be performed in response to detecting an event of interest in the live video stream or to receiving the push trigger from the video server.

The method may further comprise upon initiating a push of the live video stream to the video recorder, checking whether the live video stream is already pushed to the video recorder; upon the live video stream being already pushed to the video recorder, preventing a further push of the live video stream to the video recorder. Hence, it may be secured so that only one stream is pushed from the video camera upon simultaneous push actions at the video camera.

The method may further comprise sending from the video camera information to the video recorder indicating the detected event of interest.

The method may further comprise, upon receiving the information indicating the detected event of interest at the video recorder, recording, at the video recorder, the live video stream.

According to a second aspect a video recorder is provided. The video recorder comprising a recorder control circuitry configured to execute: a live video stream receiving function configured to receive a live video stream pushed from a video camera; a recording function configured to record the live video stream upon receiving information from the video camera indicating a detected event in the live video stream; and a pull function configured to receive a pull request for the live video stream from a video server and to transmit the live video stream to the video server.

The recorder control circuitry may further be configured to execute a trigger routing function configured to route, to the video camera, a push trigger instructing the video camera to push the live video stream to the video recorder.

The above-mentioned features of the method according to the first aspect, when applicable, apply to this second aspect as well. In order to avoid undue repetition, reference is made to the above.

According to a third aspect a video server is provided. The video server comprising a server control circuitry configured to execute: a request function configured to, from a client device, receive a request for a live video stream from a video camera; a push trigger function configured to transmit a push trigger to the video camera, the push trigger instructing the video camera to push the live video stream to a video recorder; and a pull request function configured to transmit a pull request for the live video stream to the video recorder and to receive the live video stream pulled from the video recorder. The request function is further configured to transmit the live video stream received from the video recorder to the client device.

The above-mentioned features of the method according to the first aspect, when applicable, apply to this third aspect as well. In order to avoid undue repetition, reference is made to the above.

According to a fourth aspect a video camera is provided. The video camera comprising a camera transceiver configured to send and receive data from and to the video camera; and a camera control circuitry. The camera control circuitry is configured to execute: a live video stream function configured to generate a live video stream; a push function configured to open a push connection to a video recorder and to push the live video stream to the video recorder via the opened push connection; an event detection function configured to detect an event in the live video stream and upon detection of the event in the live video stream instruct the push function to push the live video stream to the video recorder; and a push trigger receiving function configured to receive, via the camera transceiver, a push trigger instructing the video camera to push the live video stream to the video recorder and to upon receiving the push trigger instruct the push function to push the live video stream to the video recorder. The push function is further configured to, upon receiving the instruction to push the live video stream to the video recorder, check whether the live video stream is already pushed via an already opened push connection and if so prevent opening of another push connection.

The event detection function may further be configured to, send metadata comprising information indicating the detected event in the live video stream to the video recorder.

The above-mentioned features of the method according to the first aspect, when applicable, apply to this fourth aspect as well. In order to avoid undue repetition, reference is made to the above.

According to a fifth aspect system for streaming a live video stream is provided. The system comprising: a video camera configured to generate the live video stream, a video recorder, and a video server configured to receive, from a client device, a request for the live video stream from the video camera, and to transmit a push trigger to the video camera, the push trigger instructing the video camera to push the live video stream to the video recorder. The video camera upon receiving the push trigger is configured to push the live video stream to the video recorder. The video server is configured to pull the live video stream from the video recorder and stream the live video stream to the client device.

The video recorder and video server may be separate devices connected in a network.

The video recorder and video server may be implemented in a same device.

The above-mentioned features of the method according to the first aspect, when applicable, apply to this fifth aspect as well. In order to avoid undue repetition, reference is made to the above.

The above-mentioned features of the video recorder according to the second aspect, when applicable, apply to the video recorder of the system according to the fifth aspect. In order to avoid undue repetition, reference is made to the above.

The above-mentioned features of the video server according to the third aspect, when applicable, apply to the video server of the system according to the fifth aspect. In order to avoid undue repetition, reference is made to the above.

The above-mentioned features of the video camera according to the fourth aspect, when applicable, apply to the video camera of the system according to the fifth aspect. In order to avoid undue repetition, reference is made to the above.

A further scope of applicability will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that the teachings are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

Figure 1A:
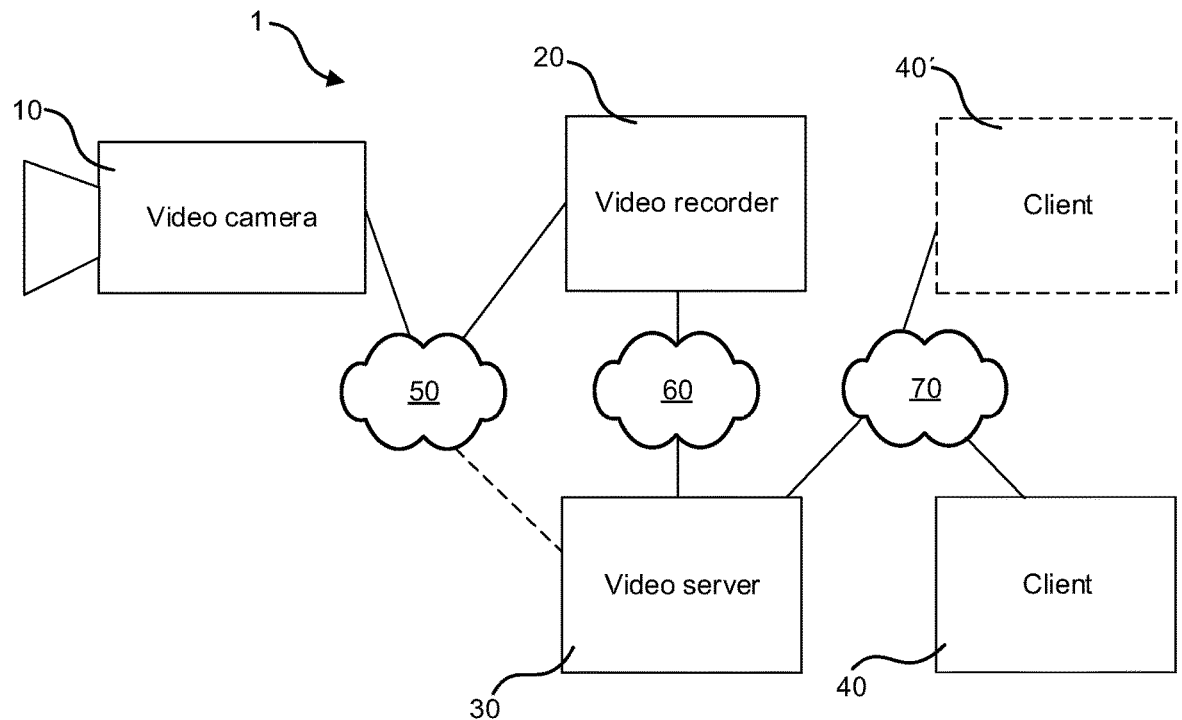
FIGS. 1A and 1B illustrate two different implementations of a system for streaming a live video stream.

The present embodiments will now be described more fully hereinafter with reference to the accompanying drawings. This teaching may, however, be embodied in many different forms and should not be construed as limited to the embodiments set forth herein; rather, these embodiments are provided for thoroughness and completeness, and to fully convey the scope to the skilled person.

In connection with FIGS. 1A and 1B two different implementations of a system 1 for streaming a live video stream will be discussed. For both implementations the system 1 comprises a video camera 10, a video recorder 20 and a video server 30. Further, for both implementations the video camera 10 is typically a networked video camera configured to communicate with other devices over a network 50. Especially, the video camera 10 is configured to generate a live video stream and to transmit the live video stream over the network 50. The network 50 may be a local area network, LAN, or a wide area network, WAN. The network 50 may be implemented as a wired network, a wireless network or a combination thereof. The video camera 10 is configured to communicate with the video recorder 20, or vice versa, over the network 50. Also, the video camera 10 may be configured to communicate with the video server 30, or vice versa, over the network 50.

As illustrated in FIG. 1A the video recorder 20 and the video server 30 may be implemented as separate devices connected in a network 60. The network 60 may be a local area network, LAN, or a wide area network, WAN. The network 60 may be implemented as a wired network, a wireless network or a combination thereof. The network 60 interconnecting the video recorder 20 and the video server 30 and the network 50 connecting the video camera 10 with other devices may overlap.

Figure 1B:
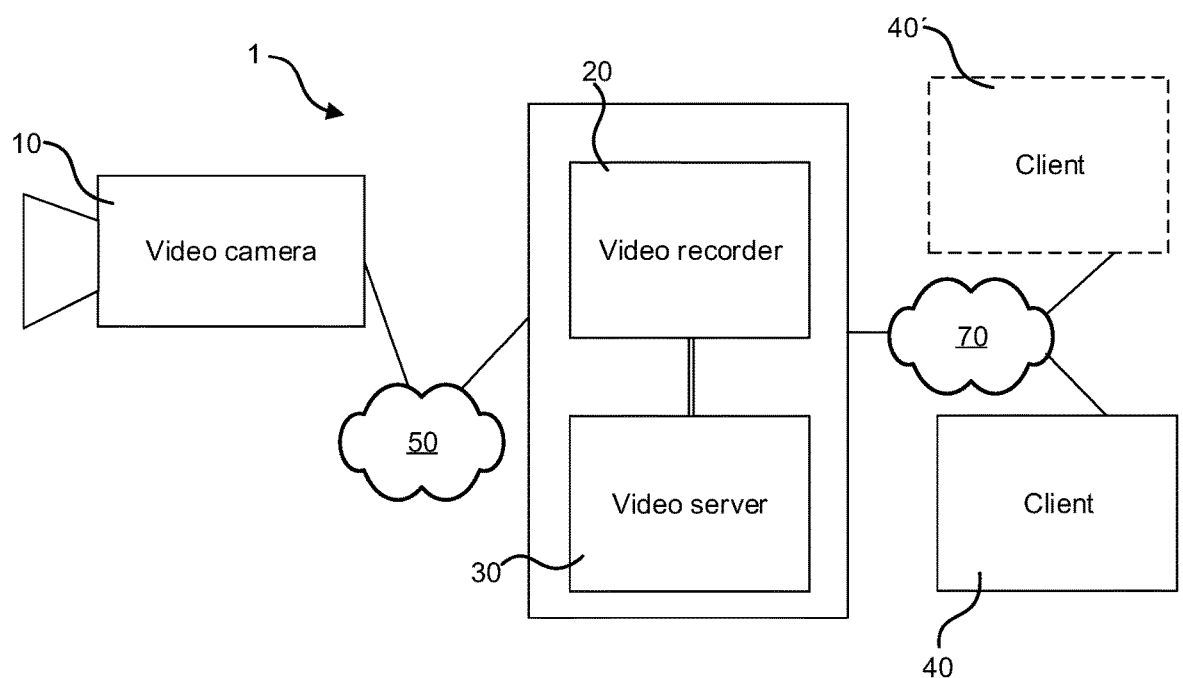

As illustrated in FIG. 1B, alternatively, the video recorder 20 and the video server 30 may be implemented in a same device. For example, the video recorder 20 and the video server 30 may be implemented in a common server device. The functionality of the video recorder 20 may be implemented in a video recorder portion of the same device (i.e. the common server device). The functionality of the video server 30 may be implemented in a video server portion of the same device (i.e. the common server device).

Regardless the implementation of the video recorder 20 and the video server 30 in the system 1, the system 1 is configured for recording of the live video stream, or at least a sequence of the live video stream, at the video recorder 20. This will be described in further detail hereinafter. Further, regardless the implementation of the video recorder 20 and the video server 30 in the system 1, the system 1 is configured for streaming a live video stream from the video camera 10 to one or more client devices 40, 40' connected to the system 1. The video server 30 is configured to manage the streaming of the live video stream to the one or more client devices 40, 40'. This will be described in further detail hereinafter.

A client device 40, 40' may be any kind of device configured to receive and display the live video stream. According to non-limiting examples the client device 40, 40' may be a laptop, a stationary computer, a mobile phone, or a tablet. The one or more client devices 40, 40' are connected to the video server 30 via a network 70. The network 70 may be a local area network, LAN, or a wide area network, WAN. The network 70 may be implemented as a wired network, a wireless network or a combination thereof. The network 70 may overlap any of the network 50 connecting the video camera 10 with other devices or the network 60 interconnecting the video recorder 20 and the video server 30.

Figure 3:
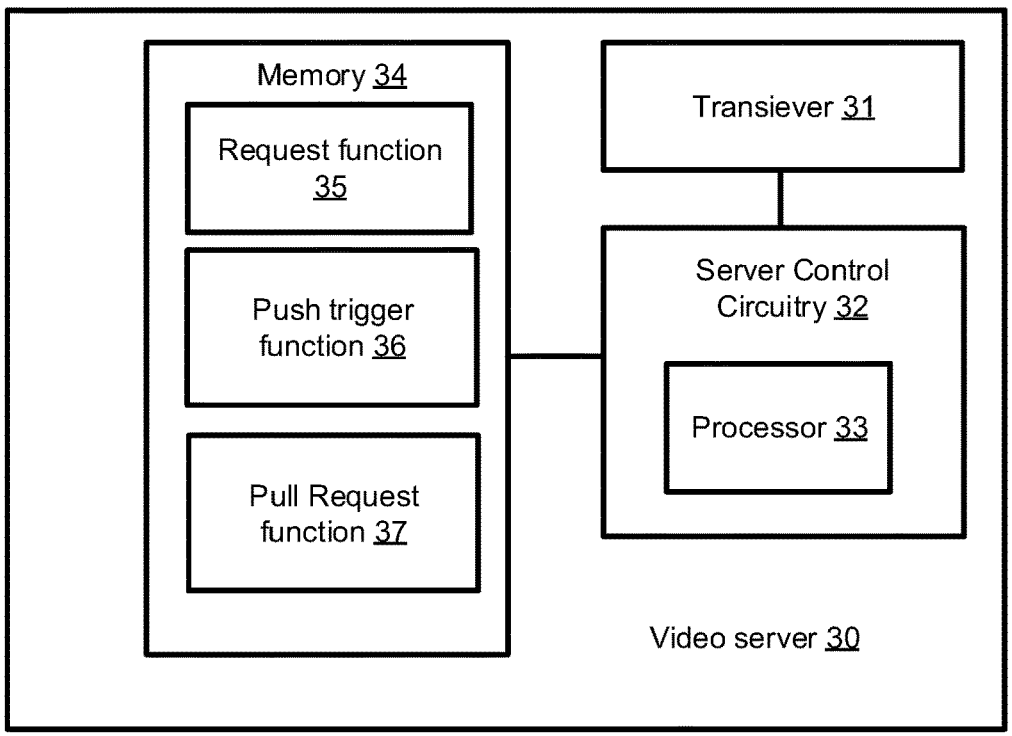
FIG. 3 is a schematic block diagram of a video server of the system illustrated in FIGS. 1A and 1B.

As mentioned above, the video server 30 is configured to manage the streaming of the live video stream generated by the video camera 10 to the one or more client devices 40, 40'. This and other functionality of the video server 30 will now be discussed in more detail in connection with FIG. 3. The video server 30 comprises a server transceiver 31, a server control circuitry 32, and a server memory 34.

The server transceiver 31 is configured to receive and/or transmit data over any of the networks 50, 60, 70. For example, the server transceiver 31 is configured to, from a client device 40, 40' receive a request for the live video stream of the video camera 10. The server transceiver 31 is further configured to transmit the live video stream generated by the video camera 10 to the client device 40, 40' requesting the live video stream.

The server control circuitry 32 is configured to carry out overall control of functions and operations of the video server 30. The server control circuitry 32 may comprise a processor 33, such as a central processing unit, microcontroller, or microprocessor. The processor 33 is configured to execute program code stored in the server memory 34, in order to carry out functions and operations of the video server 30.

The server memory 34 may be one or more of a buffer, a flash memory, a hard drive, a removable medium, a volatile memory, a non-volatile memory, a random access memory RAM, or another suitable device. In a typical arrangement, the server memory 34 may include a non-volatile memory for long term data storage and a volatile memory that functions as system memory for the server control circuitry 32. The server memory 34 may exchange data with the server control circuitry 32 over a data bus. Accompanying control lines and an address bus between the server memory 34 and the server control circuitry 32 also may be present.

Functions and operations of the video server 30 may be embodied in the form of executable logic routines (e.g., lines of code, software programs, etc.) that are stored on a non-transitory computer readable medium (e.g., the server memory 34) of the video server 30 and are executed by the server control circuitry 32 (e.g., using the processor 33). Furthermore, the functions and operations of the video server 30 may be a stand-alone software application or form a part of a software application that carries out additional tasks related to the video server 30. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The server control circuitry 32 is configured to execute a request function 35. The request function 35 is configured to receive a request for a live video stream from the video camera 10. The request for the live video stream is received from a client device 40, 40'. The request may comprise information pertaining to a video setting of the live video stream. Examples of video settings of the live video stream are resolution, frames per second (fps), compression, and encoding. Hence, the video server 30 is configured to receive a request for the live video stream of the video camera 10.

The server control circuitry 32 is further configured to execute a push trigger function 36. The push trigger function 36 is configured to generate a push trigger. The push trigger comprises information instructing the video camera 10 to push the live video stream to the video recorder 20. The push trigger may comprise information identifying the video recorder 20. The information identifying the video recorder 20 may be an IP-address, a MAC-address or any other kind of information uniquely identifying the video recorder 20. The push trigger may further comprise information on a duration time of performing the push. Such duration time may be in the order of seconds to minutes. Alternatively, the information on a duration time of performing the push may be an indication indicating to perform the push until further notice. The method may further comprise sending a stop request to the video camera instructing the video camera to stop the push. Further, the push trigger may comprise information pertaining to the video setting of the live video stream. The push trigger function 36 is configured to transmit the push trigger to the video camera 10. The push trigger function 36 may be configured to transmit the push trigger directly to the video camera 10 over the network 50. Alternatively, or in combination, the push trigger function 36 may be configured to transmit the push trigger to the video camera 10 via the video recorder 20. In other words, the push trigger is routed via the video recorder 20. Hence, upon receipt of the request for the live video stream, the video server 30 is configured to generate the push trigger and to transmit the push trigger to the video camera 10. The push trigger instructing the video camera 10 to push the live video stream to the video recorder 20. The push trigger may be sent as a single message containing all information of the push trigger. Alternatively, the push trigger may be sent as a plurality of messages comprising at least partly different information. For example, the information on a duration time for performing the push and/or information pertaining to the video setting of the live video stream may be sent as separate messages.

The server control circuitry 32 is further configured to execute a pull request function 37. The pull request function 37 is configured to transmit a pull request for the live video stream to the video recorder 20. The pull request function 37 is further configured to receive the live video stream pulled from the video recorder 20.

Upon the video server 30 has received the live video stream, the request function 35 is further configured to transmit the live video stream to the client device 40, 40' having sent the request for the same.

Further, in case a plurality of client devices 40, 40' request the same live video stream, only one live video stream is to be pulled by the video server 30. That one live video stream is then transmitted to each of the plurality of client device 40, 40' by the video server 30, so called stream re-use. Hence, the request function 35 may be configured to check if the live video stream requested for in a request received from a client device 40, 40' is already available at the video server 30. If so the request function 35 is further configured to transmit the already available live video stream to the client device 40, 40' having sent the request for the same. This without the push trigger function 36 being initiated to send a push trigger to the video camera 10. Again, it is noted that a specific live video stream is a live video stream from a specific video camera 10 and having specific video setting(s). Hence, different client devices 40, 40' may request a live video stream from the same video camera but with different video setting(s). These live video stream may be seen as different live video streams. However, in case the video server 30 has access to a live video stream with a first video setting from a specific video camera 10, the video server 30 may be configured to transcode the live video stream with the first video setting from the specific video camera 10 to another live video stream with a second video setting from the specific video camera 10.

Figure 2:
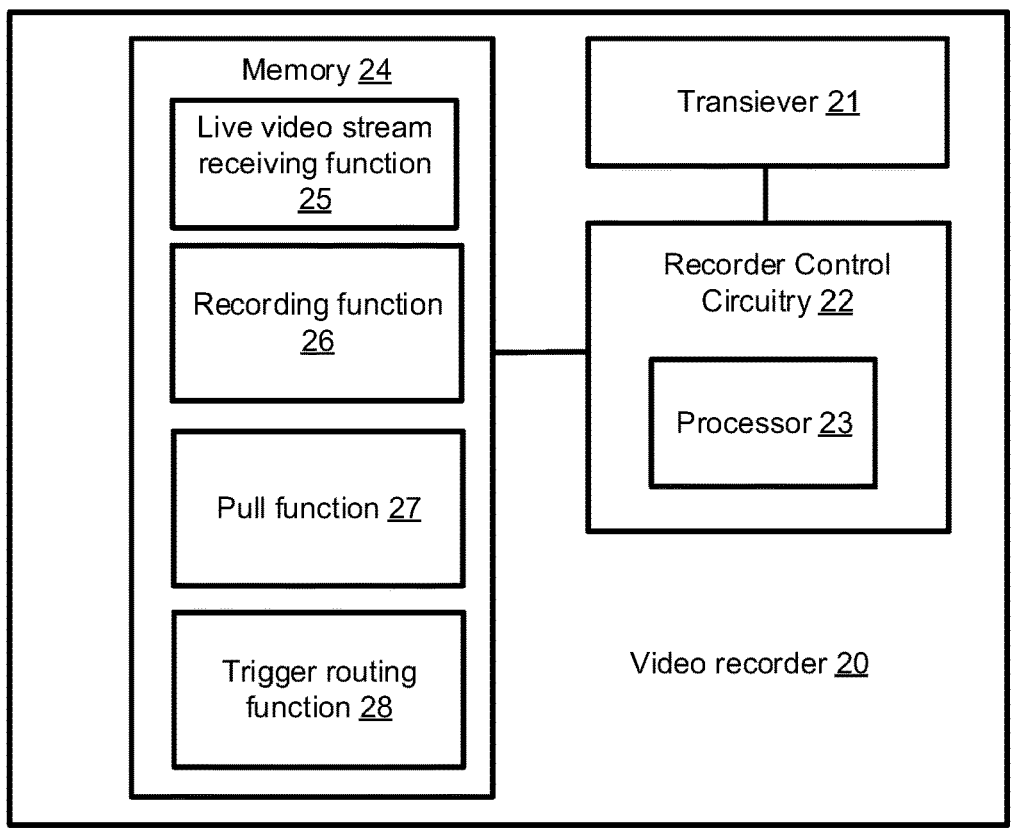
FIG. 2 is a schematic block diagram of a video recorder of the system illustrated in FIGS. 1A and 1B.

As mentioned above, the possibility of recording at least a sequence of the live video stream is implemented in the system 1. The actual recording is performed by the video recorder 20. The recording and other functionality of the video recorder 20 will now be discussed in more detail in connection with FIG. 2. The video recorder 20 comprises a recorder transceiver 21, a recorder control circuitry 22, and a recorder memory 24.

The recorder transceiver 21 is configured to receive and/or transmit data over any of the networks 50, 60. For example, the recorder transceiver 31 is configured to, from a video camera 10 receive the live video stream generated by the video camera 10.

The recorder control circuitry 22 is configured to carry out overall control of functions and operations of the video recorder 20. The recorder control circuitry 22 may comprise a processor 23, such as a central processing unit, microcontroller, or microprocessor. The processor 23 is configured to execute program code stored in the recorder memory 24, in order to carry out functions and operations of the video recorder 20.

The recorder memory 24 may be one or more of a buffer, a flash memory, a hard drive, a removable medium, a volatile memory, a non-volatile memory, a random access memory RAM, or another suitable device. In a typical arrangement, the recorder memory 24 may include a non-volatile memory for long term data storage and a volatile memory that functions as system memory for the recorder control circuitry 22. The recorder memory 24 may exchange data with the recorder control circuitry 22 over a data bus. Accompanying control lines and an address bus between the recorder memory 24 and the recorder control circuitry 22 also may be present.

Functions and operations of the video recorder 20 may be embodied in the form of executable logic routines (e.g., lines of code, software programs, etc.) that are stored on a non-transitory computer readable medium (e.g., the recorder memory 24) of the video recorder 20 and are executed by the recorder control circuitry 22 (e.g., using the processor 23). Furthermore, the functions and operations of the video recorder 20 may be a stand-alone software application or form a part of a software application that carries out additional tasks related to the video recorder 20. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The recorder control circuitry 22 is configured to execute a live video stream receiving function 25. The live video stream receiving function 25 is configured to receive a live video stream pushed from a video camera 10.

The recorder control circuitry 22 is further configured to execute a recording function 26. The recording function 26 is configured to record the live video stream. Typically, the recording function 26 is configured to record sequences of the live video stream, especially sequences of the live video stream comprising an event of interest. The recording function 26 may be notified that the live video stream comprises event of interest by being provided with information from the video camera 10 indicating a detected event of interest in the live video stream. Such information indicating a detected event of interest in the live video stream may be received from the video camera 10 as metadata. The metadata may be embedded in the live video stream, e.g. in headers of frames of the live video stream. The recording function 26 may be configured to record frames comprising such header information. Hence, the recording function 26 may be configured to analyze the received live video stream for finding information from the video camera 10 indicating a detected event of interest in the live video stream. Alternatively, or in combination, metadata comprising information from the video camera 10 indicating a detected event of interest in the live video stream may be sent from the video camera 10 as dedicated metadata in a metadata stream. The metadata stream may be pushed from the video camera 10. Hence, the recording function 26 may be configured to act on receipt of such metadata and starting a recording session recording a sequence of the live video stream. The recording function 26 may record the sequence of the live video stream on the memory 24 of the video recorder 20.

The recorder control circuitry 22 is further configured to execute a pull function 27. The pull function 27 is configured to receive a pull request for the live video stream. The pull request is typically received from the video server 30. The pull function 27 is further configured to, upon receipt of the pull request, transmit the live video stream to the sender of the pull request, typically the video server 30.

The recorder control circuitry 22 may further be configured to execute a push trigger routing function 28. The push trigger routing function 28 is configured to route, to the video camera 10, a push trigger instructing the video camera 10 to push the live video stream to the video recorder 20. The push trigger is typically received from the video server 30.

Figure 4:
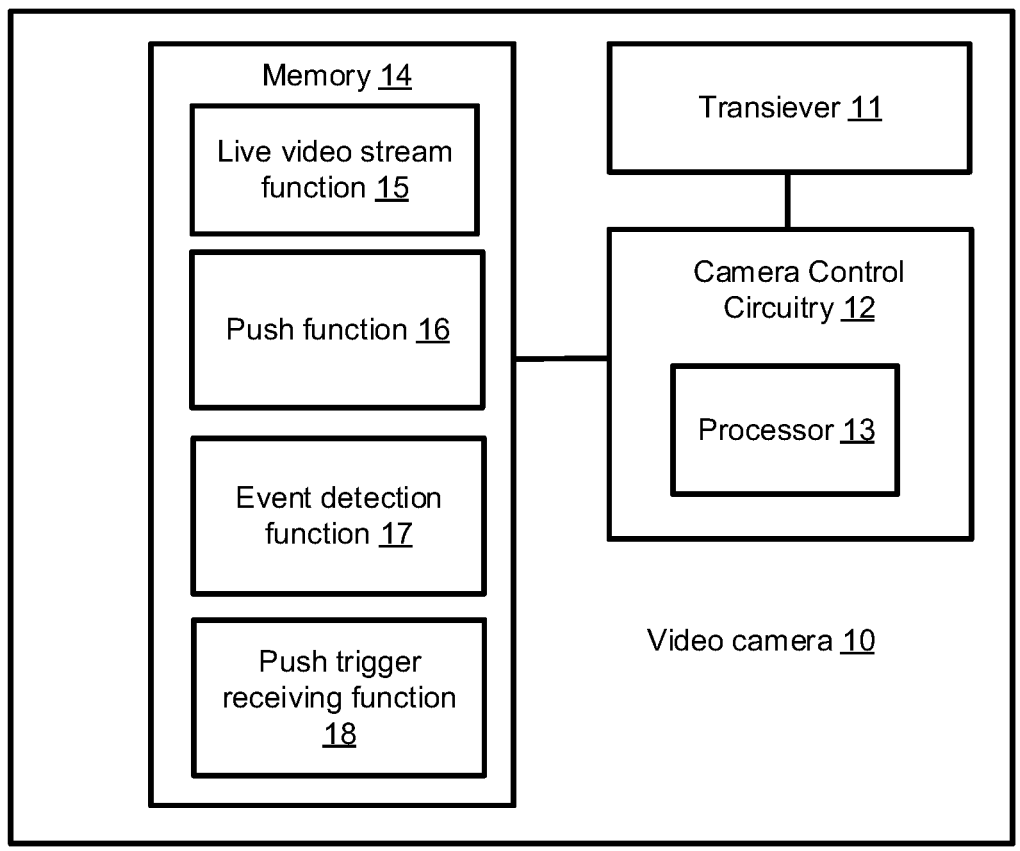
FIG. 4 is a schematic block diagram of a video camera of the system illustrated in FIGS. 1A and 1B.

Live video stream generation and other functionality of the video camera 10 will now be discussed in more detail in connection with FIG. 4. The video camera 10 comprises a camera transceiver 11, a camera control circuitry 12, and a camera memory 14.

The camera transceiver 11 is configured to receive and/or transmit data over the network 50. For example, the camera transceiver 11 is configured to transmit a live video stream. Especially, to transmit the live video stream to the video recorder 20. Further, the camera transceiver 11 is configured to receive a push trigger instructing the video camera 10 to push the live video stream to the video recorder 20. Especially, to receive a push trigger generated at the video server 30. The push trigger may be received directly from the video server 30. Alternatively, or in combination, the push trigger may be received from the video recorder 20 then routing a push trigger received from the video server 30.

The camera control circuitry 12 is configured to carry out overall control of functions and operations of the video camera 10. The camera control circuitry 12 may comprise a processor 13, such as a central processing unit, microcontroller, or microprocessor. The processor 13 is configured to execute program code stored in the camera memory 14, in order to carry out functions and operations of the video camera 10.

The camera memory 14 may be one or more of a buffer, a flash memory, a hard drive, a removable medium, a volatile memory, a non-volatile memory, a random access memory RAM, or another suitable device. In a typical arrangement, the camera memory 14 may include a non-volatile memory for long term data storage and a volatile memory that functions as system memory for the camera control circuitry 12. The camera memory 14 may exchange data with the camera control circuitry 12 over a data bus. Accompanying control lines and an address bus between the camera memory 14 and the camera control circuitry 12 also may be present.

Functions and operations of the video camera 10 may be embodied in the form of executable logic routines (e.g., lines of code, software programs, etc.) that are stored on a non-transitory computer readable medium (e.g., the camera memory 14) of the video camera 10 and are executed by the camera control circuitry 12 (e.g., using the processor 13). Furthermore, the functions and operations of the video camera 10 may be a stand-alone software application or form a part of a software application that carries out additional tasks related to the video camera 10. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The camera control circuitry 12 is configured to execute a live video stream function 15. The live video stream function 15 is configured to generate a live video stream. The live video stream function 15 may be configured to generate the live video stream with a specific video setting. Different video settings were discussed above in connection with the request function 35 executed by the server control circuitry 32 and will not be repeated here. The skilled person understands that in order for generating a live video stream the live video stream function 15 needs to have access to video data captured by an image sensor of the video camera 10. Further, generation of a live video stream is known to the skilled person and will not be further elaborated upon in this disclosure.

The camera control circuitry 12 is further configured to execute a push function 16. The push function 16 is configured to open a push connection to the video recorder 20, typically through the network 50. The push function 16 is further configured to push the live video stream to the video recorder 20 via the opened push connection.

The camera control circuitry 12 may further be configured to execute an event detection function 17. The event detection function 17 is configured to detect an event of interest in the live video stream. An event of interest may e.g. be detection of movement in the live video stream and/or detection of an object belonging to a specific class of objects, e.g. a face, a human, a cat, a car, etc. Motion detection and/or object detection in a video stream are known to the skilled person and will not be further elaborated upon in this disclosure. The event detection function 17 may be configured to upon detection of the event of interest instruct the push function 16 to push the live video stream to the video recorder 20. The event detection function 17 may further be configured to upon detection of the event of interest generate metadata indicating the detected event of interest in the live video stream. The event detection function 17 may further, be configured to transmit such metadata to the video recorder 20. The event detection function 17 may embed the metadata in the live video stream. Alternatively, or in combination, the event detection function 17 may transmit the metadata in a metadata stream to be transmitted to the video recorder 20. The metadata stream may be sent via a metadata connection between the video camera 10 and the video recorder 20. The metadata connection may be opened by the event detection function 17.

The camera control circuitry 12 may further be configured to execute a push trigger receiving function 18. The push trigger receiving function 18 is configured to receive, via the camera transceiver 11, a push trigger instructing the video camera 10 to push the live video stream to the video recorder 20. The push trigger receiving function 18 is further configured to, upon receiving the push trigger, instruct the push function 16 to push the live video stream to the video recorder 20. The push trigger receiving function 18 may further be configured to instruct the live video stream function 15 to generate the live video stream.

The push function 16 may further be configured to, upon receiving an instruction to push the live video stream to the video recorder 20, check whether the live video stream is already pushed via an already opened push connection and if so prevent opening of another push connection. The instruction to push the live video stream to the video recorder 20 may be received from either the push trigger receiving function 18 or the event detection function 17.

Figure 5:
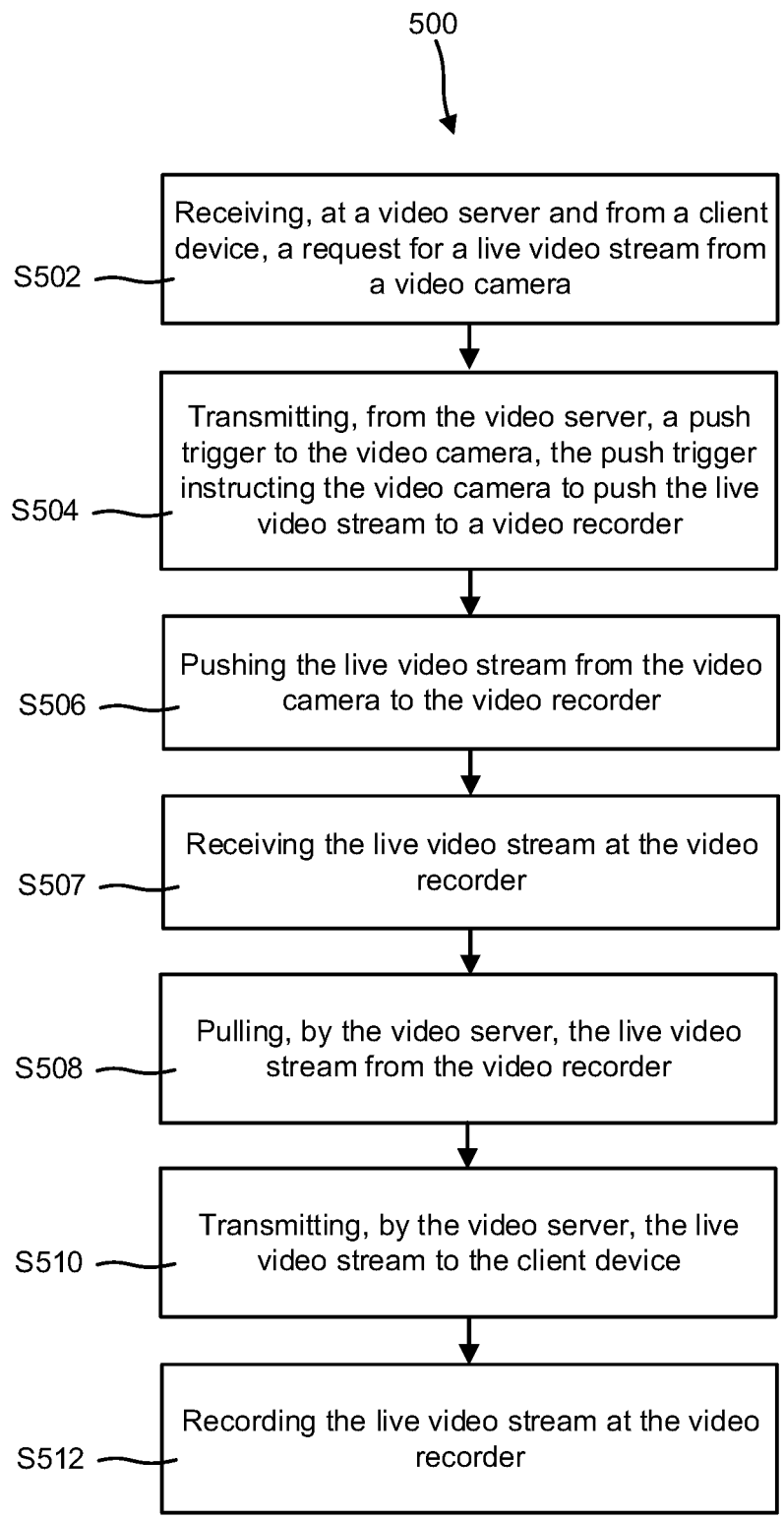
FIG. 5 is a block scheme of a method for streaming a live video stream in the system illustrated in FIGS. 1A and 1B.

A method 500 for streaming a live video stream in a system comprising the video camera 10 the video recorder 20, and the video server 30 will now be discussed in more detail in connection with FIG. 5. The method 500 comprises the following acts/steps. The order of listing the acts/steps below are not to be seen as a dedicated order of execution of the acts/steps, instead the acts/steps may be performed in any suitable order.

Receiving S502 a request for the live video stream. The request is sent from a client device 40. The request is received at the video server 30. The request comprises information pertaining to the video camera from which the live video steam is to be received. The request may further comprise information pertaining to a video setting of the live video stream. Examples of video settings of the live video stream are resolution, frames per second (fps), compression, and encoding.

Transmitting S504 a push trigger to the video camera 10. The push trigger is typically generated by the video server 30. The push trigger is further transmitted from the video server 30. The push trigger comprises information instructing the video camera 10 to push the live video stream to the video recorder 20. The push trigger may comprise information pertaining to a video setting for the live video stream. The push trigger may comprise information identifying the video recorder 20. The information identifying the video recorder 20 may be an IP-address, a MAC-address or any other kind of information uniquely identifying the video recorder 20. The push trigger may further comprise information on a duration time of performing the push. Such duration time may be in the order of minutes to hours. Alternatively, the information on a duration time of performing the push may be an indication indicating to perform the push until further notice. The method may further comprise sending a stop request to the video camera instructing the video camera to stop the push.

Transmitting S504 the push trigger to the video camera 10 may comprise a direct transmission of the push trigger from the video server 30 to the video camera 10. Alternatively, or in combination, transmitting S504 the push trigger to the video camera 10 may comprises routing the push trigger via the video recorder 20.

Upon receiving the push trigger, initiating a push of the live video stream from the video camera 10 to the video recorder 20. Pushing S506 the live video stream from the video camera 10 to the video recorder 20. The pushing S506 is typically performed by the video camera 10. The pushing S506 may be performed for the duration period indicated in the push trigger, in case the push trigger comprises information on a duration time for performing the push. In case a new push trigger is received, at the video camera 10 and within the duration period, the push of the live video stream may be kept alive for a new duration period indicated in the new push trigger.

Receiving S507 the live video stream at the video recorder 20.

Pulling S508 the live video stream from the video recorder 20. The pulling S508 is typically performed by the video server 30.

Transmitting S510 the live video stream to the client device 40. The transmitting S510 of the live video stream to the client device 40 is typically performed by the video server 30.

The method may further comprise, upon receiving S502 a request for a live video stream from a video camera 10, checking if the live video stream requested for in a request received from the client device 40 is already available at the video server 30. If so the video server may be configured to transmit the already available live video stream to the client device 40 having sent the request for the same. This without the video server 30 transmitting a push trigger to the video camera 10. Hence, in case a plurality of client devices 40, 40' request the same live video stream, only one live video stream is to be pulled by the video server 30. That one live video stream is then transmitted to each of the plurality of client device 40, 40' by the video server 30, so called stream re-use. Again, it is to be noted that a specific live video stream is a live video stream from a specific video camera 10 and having a specific video setting. Hence, different client devices 40, 40' may request a live video stream from the same video camera but with different video settings. These live video streams may be seen as different live video streams. However, in case the video server 30 has access to a live video stream with a first video setting from a specific video camera 10, the video server 30 may be configured to transcode the live video stream with the first video setting from the specific video camera 10 to another live video stream with a second video setting from the specific video camera 10.

The method may further comprise recording S512 the live video stream at the video recorder 20. The recording S512 may be performed upon receiving, at the video recorder 20, information indicating a detected event of interest in the live video stream.

The person skilled in the art realizes that the present invention by no means is limited to the preferred embodiments described above. On the contrary, many modifications and variations are possible within the scope of the appended claims.

For example, the method 500 may further comprise detecting, at the video camera 10, an event of interest in the live video stream. The method 500 may further comprise sending, from the video camera 10, information indicating the detected event of interest. The information may be sent to the video recorder 20.

The method 500 may further comprise, upon detecting an event of interest in the live video stream, pushing the live video stream from the video camera 10 to the video recorder 20.

The method 500 may further comprise, upon initiating a push for the live video stream to the video recorder 20 (from the video camera 10), checking whether the live video stream is already pushed to the video recorder 20. In case the live video stream is already pushed to the video recorder 20 the method 500 may further comprise preventing a further push of the live video stream to the video recorder 20. Hence, opening of a new push connection between the video camera 10 and the video recorder 20 is prevented.

Additionally, variations to the disclosed embodiments can be understood and effected by the skilled person in practicing the claimed invention, from a study of the drawings, the disclosure, and the appended claims.

The invention claimed is:

1. A method for streaming a live video stream in a system comprising a video camera generating the live video stream, a video recorder, and a video server, the method comprising:
    at the video server, receiving, from a client device, a request for the live video stream from the video camera;
    transmitting, from the video server, a push trigger to the video camera, the push trigger instructing the video camera to push the live video stream to the video recorder;
    upon receiving the push trigger, initiating a push of the live video stream from the video camera to the video recorder;
    pushing the live video stream from the video camera to the video recorder;
    pulling, by the video server, the live video stream from the video recorder; and
    transmitting, by the video server, the live video stream to the client device.

2. The method according to claim 1, wherein the step of transmitting, from the video server, the push trigger to the video camera comprises a direct transmission of the push trigger from the video server to the video camera.

3. The method according to claim 1, wherein the step of transmitting, from the video server, the push trigger to the video camera comprises routing the push trigger via the video recorder.

4. The method according to claim 1, further comprising:
    at the video camera continuously analyzing the live video stream for detecting an event of interest in the live video stream;
    upon detecting an event of interest in the live video stream, initiating, at the video camera, a push of the live video stream to the video recorder;
    upon initiating a push of the live video stream to the video recorder, checking whether the live video stream is already pushed to the video recorder;
    upon the live video stream is already pushed to the video recorder, preventing a further push of the live video stream to the video recorder.

5. The method according to claim 4, further comprising sending from the video camera information to the video recorder indicating the detected event of interest.

6. The method according to claim 5, further comprising, upon receiving the information indicating the detected event of interest at the video recorder, recording, at the video recorder, the live video stream.

7. A video recorder comprising a recorder control circuitry configured to execute:
    a live video stream receiving function configured to receive a live video stream pushed from a video camera;
    a recording function configured to record the live video stream upon receiving information from the video camera indicating a detected event in the live video stream;
    a pull function configured to receive a pull request for the live video stream from a video server and to transmit the live video stream to the video server.

8. The video recorder according to claim 7, wherein the recorder control circuitry is further configured to execute:
    a trigger routing function configured to route, to the video camera, a push trigger instructing the video camera to push the live video stream to the video recorder.

9. A video server comprising a server control circuitry configured to execute:
    a request function configured to, from a client device, receive a request for a live video stream from a video camera;
    a push trigger function configured to transmit a push trigger to the video camera, the push trigger instructing the video camera to push the live video stream to a video recorder; and
    a pull request function configured to transmit a pull request for the live video stream to the video recorder and to receive the live video stream pulled from the video recorder;
    wherein the request function is further configured to transmit the live video stream received from the video recorder to the client device.

10. A video camera comprising:
    a camera transceiver configured to send and receive data from and to the video camera; and
    a camera control circuitry configured to execute:
        a live video stream function configured to generate a live video stream;
        a push function configured to open a push connection to a video recorder and to push the live video stream to the video recorder via the opened push connection;
        an event detection function configured to detect an event in the live video stream and upon detection of the event in the live video stream instruct the push function to push the live video stream to the video recorder;
        a push trigger receiving function configured to receive, via the camera transceiver, a push trigger instructing the video camera to push the live video stream to the video recorder and to upon receiving the push trigger instruct the push function to push the live video stream to the video recorder, wherein the push function is further configured to, upon receiving the instruction to push the live video stream to the video recorder, check whether the live video stream is already pushed via an already opened push connection and if so prevent opening of another push connection.

11. The video camera according to claim 10, wherein the event detection function is further configured to send metadata comprising information indicating the detected event in the live video stream to the video recorder.

12. A system for streaming a live video stream, the system comprising:
a video camera configured to generate the live video stream,
a video recorder, and
a video server configured to receive, from a client device, a request for the live video stream from the video camera, and to transmit a push trigger to the video camera, the push trigger instructing the video camera to push the live video stream to the video recorder;
wherein the video camera upon receiving the push trigger is configured to push the live video stream to the video recorder;
wherein the video server is configured to pull the live video stream from the video recorder and stream the live video stream to the client device.

13. The system according to claim 12, wherein the video recorder and video server are separate devices connected in a network.

14. The system according to claim 12, wherein the video recorder and video server are implemented in a same device.

* * * * *